United States Patent
Jagota

(10) Patent No.: US 9,619,534 B2
(45) Date of Patent: Apr. 11, 2017

(54) PROBABILISTIC TREE-STRUCTURED LEARNING SYSTEM FOR EXTRACTING CONTACT DATA FROM QUOTES

(75) Inventor: Arun Kumar Jagota, Sunnyvale, CA (US)

(73) Assignee: salesforce.com, inc., San Francisco, CA (US)

(*) Notice: Subject to any disclaimer, the term of this patent is extended or adjusted under 35 U.S.C. 154(b) by 332 days.

(21) Appl. No.: 13/034,463

(22) Filed: Feb. 24, 2011

(65) Prior Publication Data

US 2012/0066160 A1 Mar. 15, 2012

Related U.S. Application Data

(60) Provisional application No. 61/381,863, filed on Sep. 10, 2010.

(51) Int. Cl.
*G06F 17/30* (2006.01)
*G06N 7/00* (2006.01)
*G06Q 30/02* (2012.01)

(52) U.S. Cl.
CPC .. *G06F 17/30563* (2013.01); *G06F 17/30345* (2013.01); *G06N 7/005* (2013.01); *G06Q 30/02* (2013.01)

(58) Field of Classification Search
USPC ........................................................ 707/602
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,386 A * | 6/1998 | Lawrence | G06K 9/00523 705/35 |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,878,386 A * | 3/1999 | Coughlin | 704/10 |
| 5,890,103 A * | 3/1999 | Carus | 704/9 |
| 5,918,159 A | 6/1999 | Fomukong et al. | |
| 5,930,746 A * | 7/1999 | Ting | G06F 17/271 704/2 |
| 5,956,676 A * | 9/1999 | Shinoda | G10L 15/07 704/244 |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |

(Continued)

*Primary Examiner* — William Spieler
(74) *Attorney, Agent, or Firm* — Dergosits & Noah LLP; Todd A. Noah

(57) ABSTRACT

Systems and methods for updating data stored in a database, such as contact information. An input string is obtained through a search for timely material associated with the stored contact. The input string is parsed using probabilistic tendencies to extract entities corresponding to those stored with the contact. Secondary entities are used to assist in the identification of the primary entities. The contact is then updated (or added if new) using the extracted primary entities.

19 Claims, 7 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,694,307 B2 * | 2/2004 | Julien .................. 707/706 |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,043,690 B1 * | 5/2006 | Bates et al. .................. 715/234 |
| 7,062,502 B1 | 6/2006 | Kesler |
| 7,340,411 B2 | 3/2008 | Cook |
| 7,401,094 B1 | 7/2008 | Kesler |
| 7,475,010 B2 * | 1/2009 | Chao .................. G06F 17/277 704/10 |
| 7,620,655 B2 | 11/2009 | Larsson |
| 7,698,160 B2 | 4/2010 | Beaven et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,219,533 B2 * | 7/2012 | Bennett .................. 707/692 |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0036900 A1 * | 2/2003 | Weise .................. 704/9 |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0128140 A1 * | 7/2003 | Xie et al. .................. 341/107 |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0106610 A1 * | 5/2006 | Napper .................. 704/270 |
| 2006/0245641 A1 * | 11/2006 | Viola et al. .................. 382/155 |
| 2007/0067320 A1 * | 3/2007 | Novak .................. 707/100 |
| 2007/0282595 A1 | 12/2007 | Tunning et al. .................. 704/9 |
| 2008/0221870 A1 * | 9/2008 | Attardi et al. .................. 704/9 |
| 2009/0063415 A1 | 3/2009 | Chatfield et al. |
| 2009/0234836 A1 * | 9/2009 | Peng et al. .................. 707/5 |
| 2010/0306185 A1 * | 12/2010 | Smith et al. .................. 707/709 |

\* cited by examiner

PROBABILISTIC TREE-STRUCTURED LEARNING SYSTEM FOR EXTRACTING CONTACT DATA FROM QUOTES

CLAIM OF PRIORITY

This application claims the benefit of U.S. Provisional Patent Application 61/381,863 entitled, A PROBABILISTIC TREE-STRUCTURED LEARNING SYSTEM FOR EXTRACTING CONTACT DATA FROM QUOTES by Arun Kumar Jagota, filed Sep. 10, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the records of the United States Patent and Trademark Office, but otherwise reserves all rights.

FIELD OF THE INVENTION

One or more implementations relate generally to the probabilistic parsing of an input string of data obtained from a search for relevant data.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which may be unique on their own.

In conventional database systems, users access their data resources in a single logical database. A user of such a conventional database system typically retrieves data from and stores data on the database system using the user's own computing systems or devices. For example, a user system might remotely access one of a plurality of server systems that might in turn access the database system. Data retrieval from the system might include the issuance of a query from the user system to the database system. The database system might process the request for information received in the query and send to the user system information relevant to the request. The retrieval of accurate information and subsequent delivery of this information to the user system in a timely and efficient manner has been and continues to be a goal of administrators of database systems.

However, in a multi-tenant database system ("MTS"), various elements of hardware and software of the database system may be shared by one or more customers. The notion of "cloud computing" has recently developed whereby service providers offer access to hardware/software systems through a network, such as the Internet. For example, a specified application server may simultaneously process requests for many customers, and a specified database table may store rows of data for many customers.

In the MTS environment, customers demand up-to-date, comprehensive data. For example, sales and marketing organizations need accurate and up-to-date contact information in order to maintain good relations with existing customers as well as solicit leads for new customers.

Unfortunately, conventional database approaches rely on individuals to maintain their own contact information, and therefore, even within a single organization, individuals may have inconsistent and/or inaccurate contact information.

An advantage of the MTS system is that business enterprises may share data resources, and rely on the MTS provider to maintain accurate up-to-date data, such as personal and/or business contact information. Another advantage is that all personnel within a single enterprise have access to the exact same contact information, so that inaccuracies or inconsistencies within the organization no longer exist.

Accordingly, it is desirable to provide techniques enabling updating of data stored in a database system, such as contact information, in order to provide the most up-to-date and accurate information available in seamless fashion to customers of the MTS.

BRIEF SUMMARY

In accordance with described embodiments, there are provided mechanisms and methods for extracting contact data from quotes. These mechanisms and methods for extracting contact data from quotes can enable embodiments to provide updated and accurate contact information. The ability of embodiments to provide updated, accurate contact information enhances enterprise productivity.

In an embodiment and by way of example, a method for extracting contact data from quotes is provided. The method embodiment includes obtaining and storing an input string from a search for quoted material associated with the contact. One or more entities are extracted from the input string using probabilistic techniques. A new record is created and stored for the contact if none exists, or an existing record is updated, using the extracted entities.

Extracting useful entities from an input string entails assigning a probabilistic score to various slices of the input string corresponding to various entities, and using linguistic cues in the input string to help interpret the string, then combining all the evidence from the probabilistic scores and the linguistic cues to form an accurate parse of the input string. Such a parse is also called an alignment. The main subjects of the search and the parse are predefined primary entities. Advantageously, the linguistic or grammatical cues identified in the parse are defined as secondary entities, and are used to identify primary entities. Further, training sets of input strings are used to determine probabilities associated with entity identification and alignment. These probabilities are stored and used to help evaluate actual input strings.

While one or more implementations and techniques are described with reference to an embodiment in which extracting contact data from quotes is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings, like reference numbers are used to refer to like elements. Although the following figures depict various examples, the one or more implementations are not limited to the examples depicted in the figures.

DETAILED DESCRIPTION

General Overview

Systems and methods are described for using probabilistic techniques to parse data strings in order to extract accurate information regarding stored data, such as contacts. Data strings may be obtained as the result of a query, and probabilistic tendencies are used to score likely divisions of a data string into useful "entities." When combined with linguistic cues present in the data string, an accurate parsing or "alignment" of the data string results. Finally, the primary entities resulting from the parse are used to create and/or update the stored data, e.g., contact information.

Probabilistic tendencies may be evaluated using training sets of the correct entities in the data strings, and linguistic rules are automatically extracted from the training sets by learning algorithms, such that the linguistic rules and probabilistic tendencies may be applied by algorithm to new input strings. Advantageously, a tree-like structure may be used to store probabilities that result from evaluating the training sets, and the tree structure may thus be used to parse actual input strings using these probabilities.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query refers to a set of steps used to access information in a database system.

Figure 1:
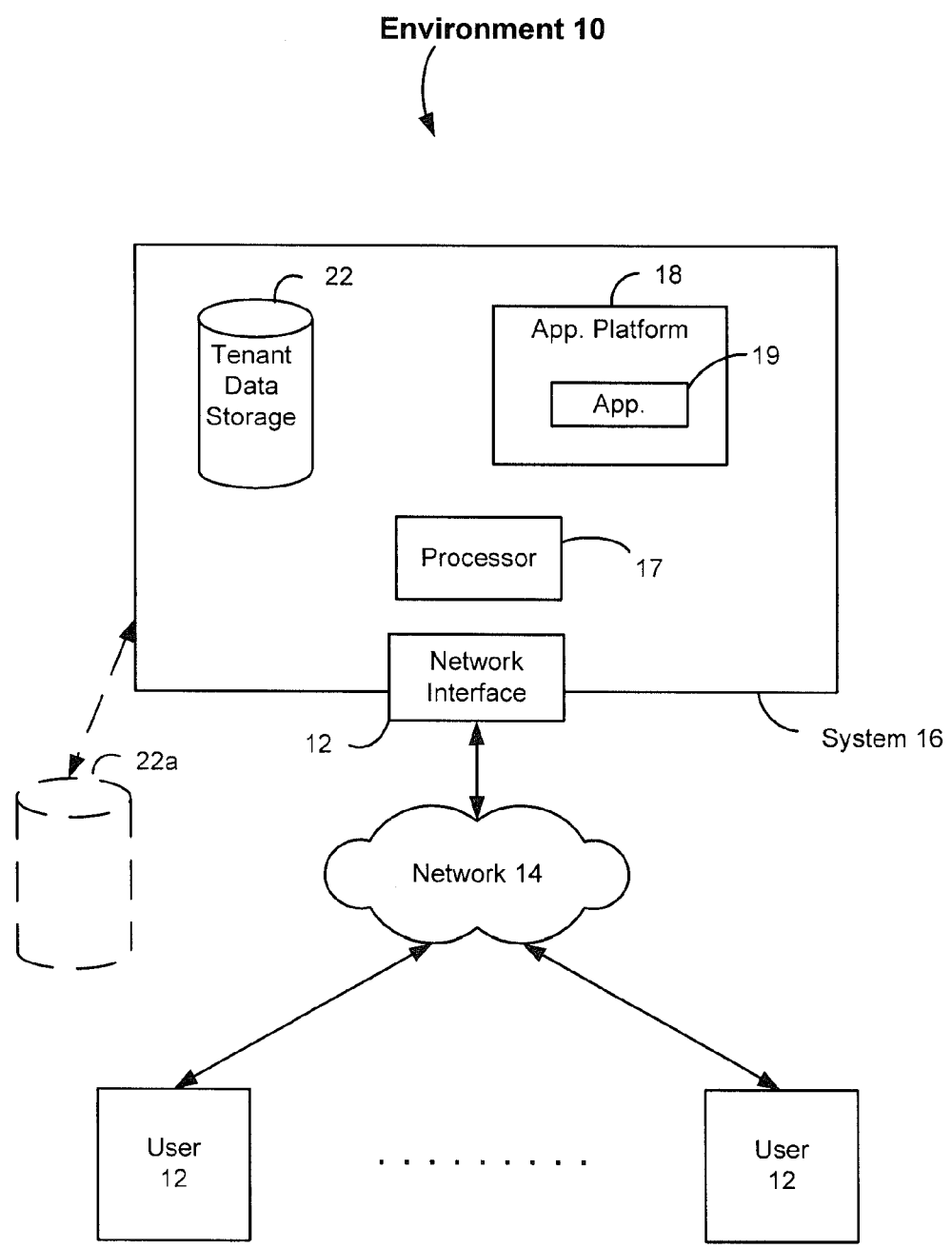
FIG. 1 is a simplified block diagram illustrating a multi-tenant database system ("MTS")
Figure 6:
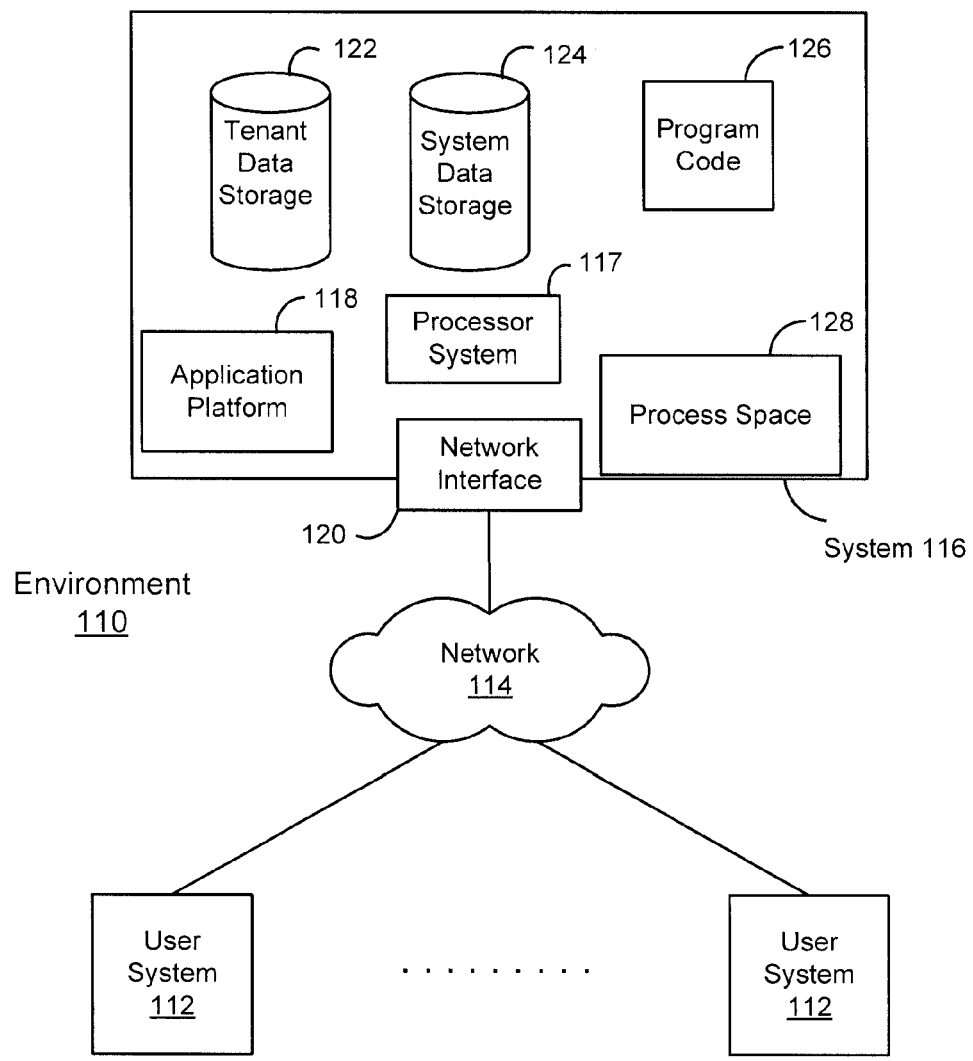
FIG. 6 illustrates a block diagram of an example of an environment wherein an on-demand database service might be used.
Figure 7:
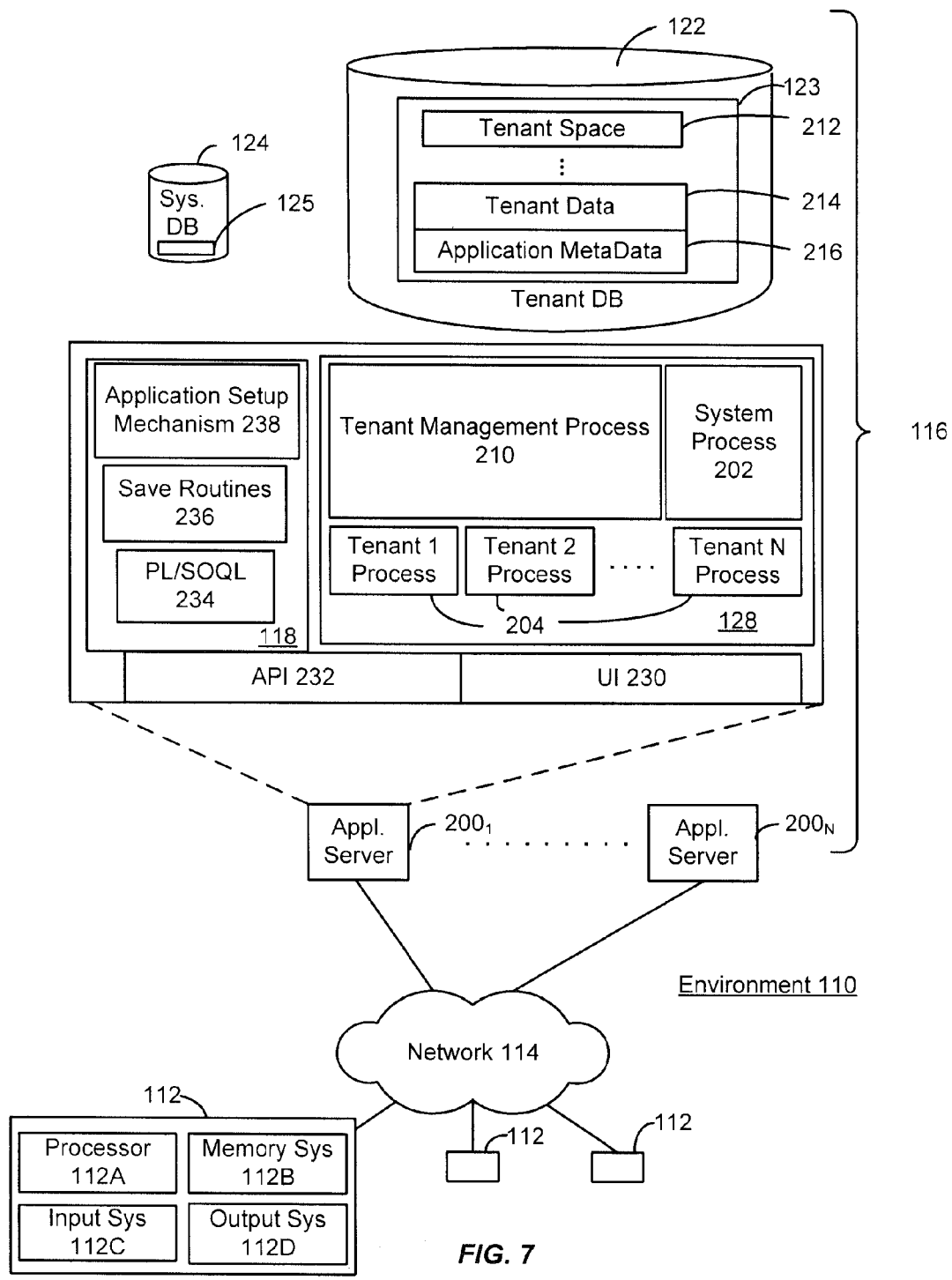
FIG. 7 illustrates a block diagram of an embodiment of elements of FIG. 6 and various possible interconnections between those elements.

An embodiment of an on-demand, multi-tenant database service ("MTS") 16 operating in a computing environment 10 is illustrated in FIG. 1, wherein user devices or systems 12 access and communicate with MTS 16 through network 14 in a known manner. More detailed examples for implementing MTS 16 are shown in FIGS. 6-7, described below. For example, user devices 12 may be any computing device, such as a digital cellular telephone, and network 14 may be any type of computing network, such as the Internet, as described in more detail below. The operation of MTS 16 is controlled by a computer-implemented processor system 17. Unique configurations of the MTS 16 are described in the following patents and patent applications, the disclosures of which are incorporated herein by reference:

MTS 16 provides the users of user systems 12 with access to many features and applications available on or through MTS 16. In particular, MTS 16 includes tenant data storage 22, which is configured through the MTS to maintain tenant data for multiple users/tenants, as further described below and in the patent references mentioned above. Tenant data storage 22 may be physically incorporated within MTS 16, or may alternatively be remote storage 22a (shown in dashed lines), likewise accessible and useful to the MTS to support user systems 12.

There are many types of tenant data that may be maintained in tenant data storage 22, including contact data, i.e., information about an individual, including name, company, address, telephone number, etc. An important objective for any user of MTS 16 is to maintain up-to-date and detailed information for all contacts. A unique feature of MTS 16 described herein is one or more applications 19, managed and operated by the MTS through its application platform 18, that facilitates this objective by crawling the Internet or any other available network or document repository to find quoted information, for example in business articles or other relevant content, then extracting relevant information from the quote to update and/or enrich the contact information, or to create a new contact. The block diagram shown in FIG. 2 illustrates this process.

Figure 2:
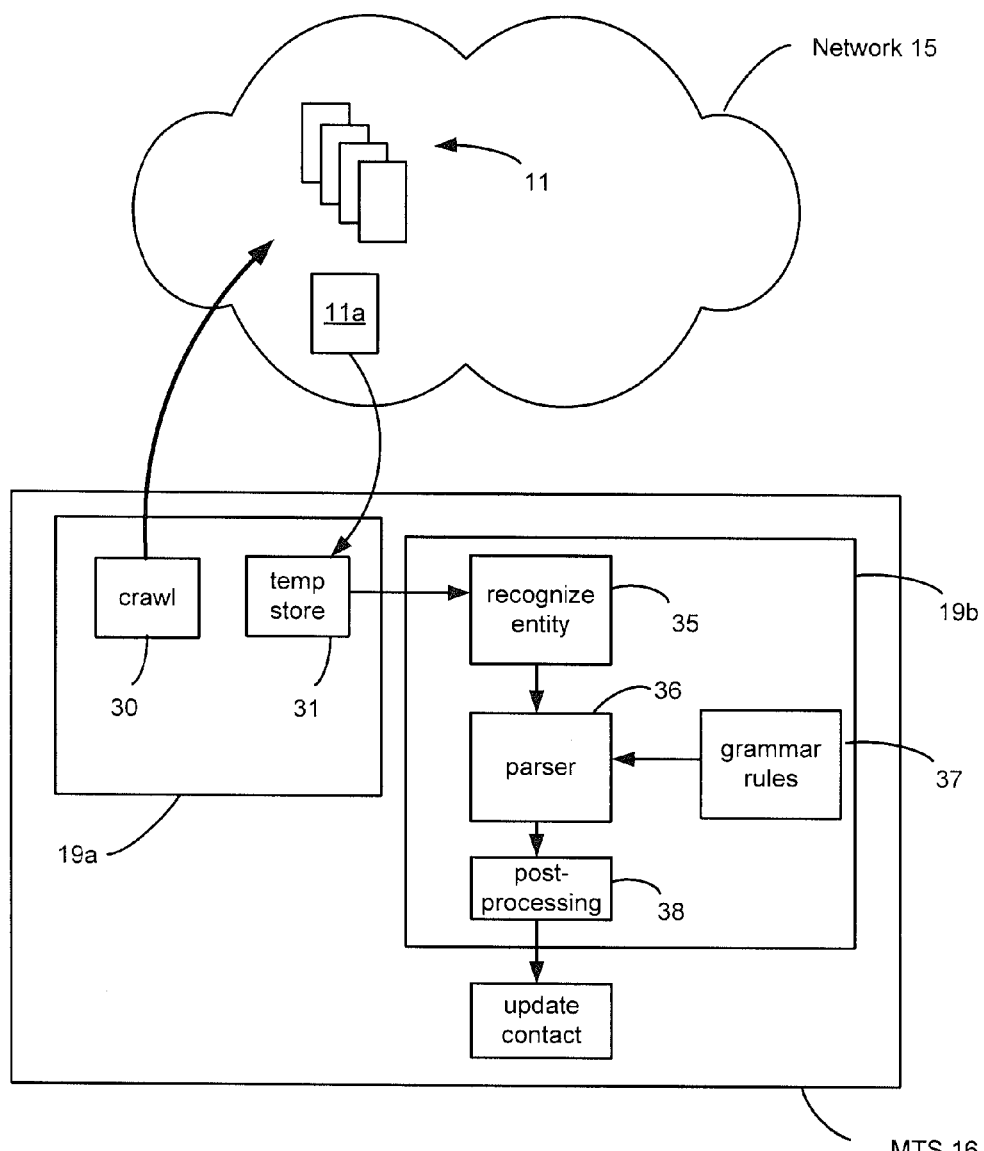
FIG. 2 is a block diagram illustrating an MTS configured to extract and parse a data string for use in updating stored data.

In FIG. 2, an application 19a is illustrated, which includes a module 30 having program code suitable to perform a crawl of network 15 to search through documents 11 for data 11a meeting search criteria. Further, the crawl module 30 includes program code suitable to flag and grab a copy of the data 11a place the grabbed material in temporary storage 31 for processing by the extractor application 19b. The creation of program code for document crawl and grab as described above is routine for those skilled in these arts and need not be described in further detail herein. For example, a web crawler program may be designed to search for and return recent quotations attributed to any individual. When found, some portion of the document containing the quotation is copied and returned for processing by extraction application 19b as described herein. Further, although two applications 19a and 19b are shown as part of the MTS 16, these applications may be located elsewhere but accessible to the MTS. Also, the construction of suitable program code and interaction between different code modules can vary greatly according to need and/or desire and thus the illustrated embodiments are not intended to be limit how various software solutions may be implemented.

Once a relevant quotation is found and placed in temporary store 31 as simple text, the extractor application 19b processes the text to extract useful information from the quotation. That information is used to update and/or enrich stored information associated with that contact 23, which is stored as a data record in MTS 16.

The extractor application 19b includes an entity recognition module 35 that is configured to recognize specific "entities" within the quotation. That is, the module 35 takes the quotation from temporary store 31 and performs an initial breaking up of the quotation based on probabilistic scoring learned from the training sets in order to recognize useful primary information such as first name, last name, company, etc., but also to recognize secondary information such as other words and punctuation, which provide contextual cues during processing that facilitates accurate dividing up of the information so as to be useful. Then, the entities are passed along to the parser module 36, where a final parse is performed using a probabilistic model and grammatical rules 37. The final parse is passed to a post-processing module 38, where only specific primary entities are extracted for use in updating contact data 23.

Accurately extracting useful "entities" from the quoted material and then using the extracted entities to update and/or enrich the user's contact information can be difficult due to the great variety of ways the quoted information may be presented. For example, sometimes the person's name appears first, sometimes later; sometimes there is a company name listed, sometimes not; sometimes the company name appears before the title of the person, sometimes after; and so on. However, notwithstanding this variability, there are also cues in the quoted text which indicate the proper characterization of an entity within the quoted material. To that end, "primary entities" are defined as the entities of primary interest, such as first_name, last_name, title and company. Further, "secondary entities" are defined for other grammatical and linguistic cues in the data being evaluated. The following examples, with bolded text indicating the primary entities to be extracted, illustrate some of these cues:

1. "The launch of PowerVue marks yet another first that Cadec has introduced to the market," said Cadec CEO Michael Baney.
2. "Cadec's PowerVue is unlike any other fleet management software I've used," said Len Kennedy, Senior Director of Fleet Operations at COI Foodservice.
3. "According to a recent survey conducted by Computerworld," says Eric Madison, Abrevity's Director of Marketing, "over 42% of the IT professionals . . ."
4. "There are actually two sides to solving the data classification problem for today's enterprises," says Eric Madison, vice president of product strategy for Abrevity.
5. "If you look at some of the most successful products in the electronics industry, software plays a tremendous part," said Kevin Frost, general manager of consumer notebooks at HP.
6. "This is an area you traditionally would not think of us as being in," said Phil McKinney, chief technology officer in HP's Personal Systems Group.
7. "This is the part of the Windows Vista backlash that really matters," said IDC analyst Richard Shim, who had recently seen HP's Linux mini-laptop.
8. "The computer makers were scared to death of them," said Enderle.
9. Werner will be represented at the conference by John J. Steele, Executive Vice President, Treasurer and Chief Financial Officer.
10. "We've installed Abrevity's FileData Classifier to help with tiered storage and information security," says Michael Masterson, IT Architect at a Fortune 500 company.
11. "We've done x,y,z", said Terry Mitchell, President of Fannie May.

The cues are recognized by an algorithm and may be used to emulate grammatical rules learned from the training sets. For example, the use of the word "at" may indicate that a company name will follow, and therefore will not be located before that term. The word "for" may be used in the same way. If a word ends in an apostrophe, then the word is likely to be the company name, or at least the last word in the company name. A comma is also a useful predictor of what entities are on either side of the comma.

There are also other cues which, though less definitive, are still useful. For example, the word "of" is used as part of the title in examples 2-5, but sometimes what follows is the company name, as in example 11.

Thus, in one embodiment described herein, the problem of extracting entities is modeled as a parsing problem on a certain grammar. However, since we do not know all the patterns in advance, the grammar will be learned empirically and automatically from a training set, and will be revised automatically as new training examples arrive. Some illustrative training sets are shown below in Tables 1-4. It should be understood that many training sets are possible, and in fact, the probabilities that are derived from training sets used for extraction and/or alignment of entities, and the likelihood of accurate parsing improves with each additional training set learned. Therefore, what results is a probabilistic grammar model, with probabilistic parsing.

Training Set Example 1: "Jennifer Schubert-Akin, chairman of the newly formed Steamboat Institute" is parsed as shown in Table 1.

TABLE 1

| Training Set | |
|---|---|
| entity | value |
| first_name | Jennifer |
| last_name | Schubert-Akin |
| comma | , |
| title | chairman |
| of | of |
| the | the |
| company qualifier | new formed |
| company | Steamboat Institute |

Training Set Example 2: "Jeff Brown, general manager, Professional Solutions, NVIDIA" is parsed as shown in Table 2.

TABLE 2

| Training Set | |
|---|---|
| entity | value |
| first_name | Jeff |
| last_name | Brown |
| comma | , |
| title | general manager |
| comma | , |
| title suffix | Professional Solutions |
| company | NVIDIA |

Training Set Example 3: "Randall Stevens, CEO of Mersive, a leading display technology company" is parsed as shown in Table 3.

TABLE 3

Training Set

| entity | value |
| --- | --- |
| first_name | Randall |
| last_name | Stevens |
| comma | , |
| title | CEO |
| of | of |
| company | Mersive |
| comma | , |
| a | a |
| company qualifier | leading |
| company descriptor | display technology |
| company noun | company |

Training Set Example 4: "Curt Henninger, Senior Vice President of Comcast's Oregon & SW Washington Region" is parsed as shown in Table 4.

TABLE 4

Training Set

| entity | value |
| --- | --- |
| first_name | Curt |
| last_name | Henninger |
| comma | , |
| title | Senior Vice President |
| of | of |
| company | Comcast |
| apostrophe | 's |
| state | Oregon |
| and | & |
| direction | SW |
| state | Washington |
| region | Region |

A significant number of training set examples (e.g., approximately 300) such as those illustrated in Tables 1-4 can be used to initially train the algorithm so that it returns a logical sequence of entities with a high probability of being an accurate sequence.

Figure 3:
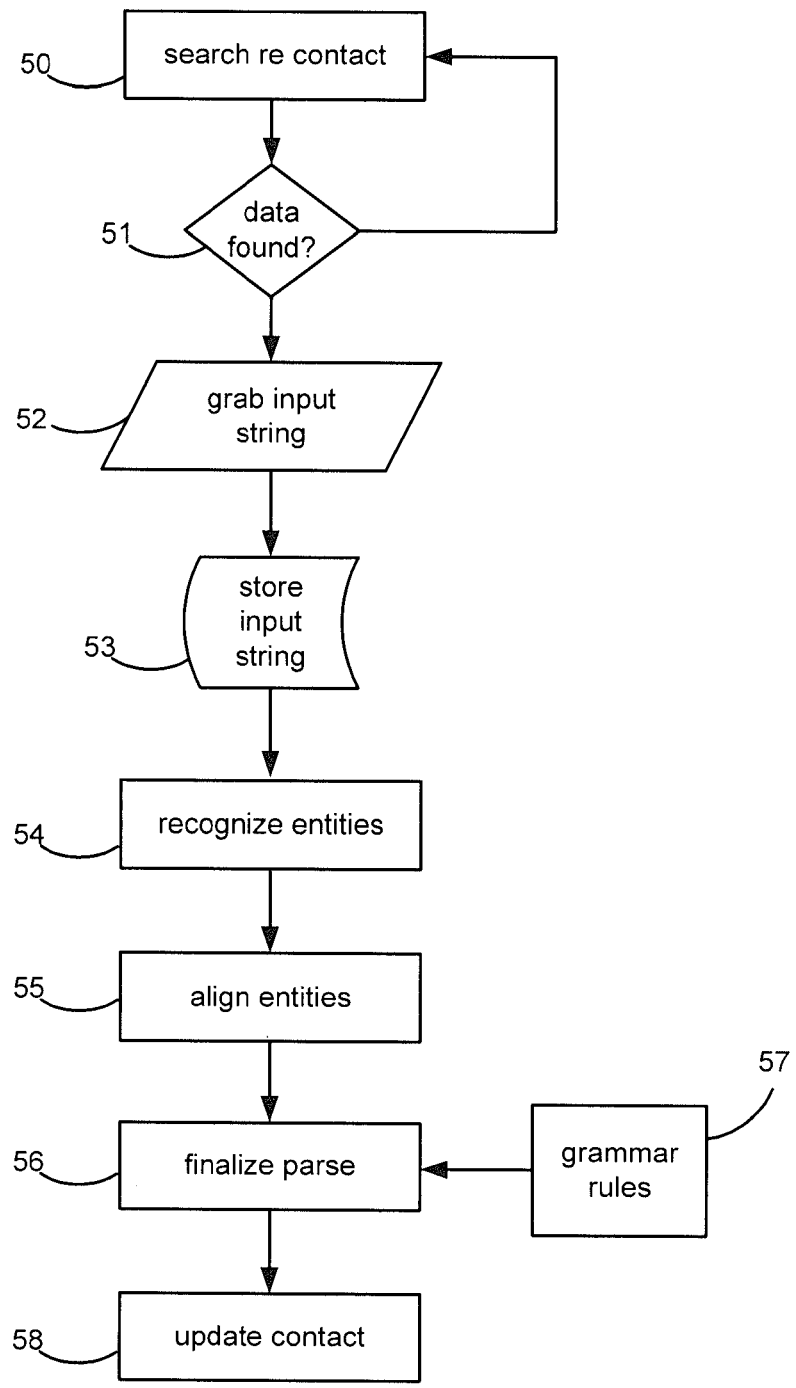
FIG. 3 is an operational flow diagram illustrating an embodiment of a process for parsing a data string.

Consistent with the block diagram of FIG. 2, FIG. 3 is a simplified flow chart showing the basic method of an embodiment for updating a contact. In step 50, a search is conducted for articles which quote or reference a contact of interest. In step 51, if information about the contact is found in the search, then an input string is obtained from the quoted material in step 52 and placed in temporary storage in step 53 for processing. If no information is found in step 51, the method returns to step 50 to search for other contacts.

In step 54, individual entities are recognized based on probabilistic scoring, and then the entities are correlated to predefined entity fields in step 55, or assigned newly defined entity fields. In step 56, the entities are formed into a definitive parse of the input string utilizing grammatical rules which are emulated in the training sets in step 57. Once the parse is finalized, the information represented by the parse is used to update the contact information in step 58.

Clearly, parsing necessarily relies on accurate entity recognition. However, entity recognition is inherently probabilistic, because one cannot always determine with 100% certainty whether a certain sequence of words is a title or a company or a person name. Thus, the entity recognition and alignment steps 54/55 pass probabilistic signals to the parser step 56, which must use them, along with the probabilistic grammatical rules of step 57 to find the most probable parse.

Consider the following example of a data string obtained in a search: "Len Kennedy, Senior Director of Fleet Operations at COI Foodservice." The entity recognizer thinks "Len" is a first name and "Kennedy" is a last name. This is reinforced by the word order (Len appears before Kennedy), which is considered a grammatical cue. This is further reinforced by the comma that follows. That which precedes a comma in this context is much more often a person name than a company or a title. The 'at' strongly suggests that what follows it is a company name. This is especially useful when the company name is not known, i.e., the entity recognizer has not been trained on it. Further, since the company name is likely to be "COI FoodService" then what follows the word "of" (Fleet Operations) is likely to be an extension of the title. Note, however, that if the 'at' and what follows it was missing, it could be harder to resolve whether the string that follows 'of' is a company name or a title, since the word "of" predicts both company and title to its right. Of course, the entity recognizer may have already been adequately trained to recognize this string as one of company name or title.

Consider another example of a data string obtained in a search: "Reid Stratton, Seven Summits Senior Analyst." The probabilistic parse shown in Table 5 would seem to have the highest probability of being accurate:

TABLE 5

| entity | Value |
| --- | --- |
| first_name | Reid |
| last_name | Stratton |
| comma | , |
| company | Seven Summits |
| title | Senior Analyst |

The high probability of this parse comes from combining the entity recognition and grammatical information. For example, although "Reid" could be a first or last name, when combined with the probabilistic grammatical preference "first_name immediately precedes last_name," the parse first_name=Reid, last_name=Stratton is more likely. Further, the comma following these two entities adds more weight to this parse because a person name tends to precede the first comma much more often than a company or a title.

Figure 4:
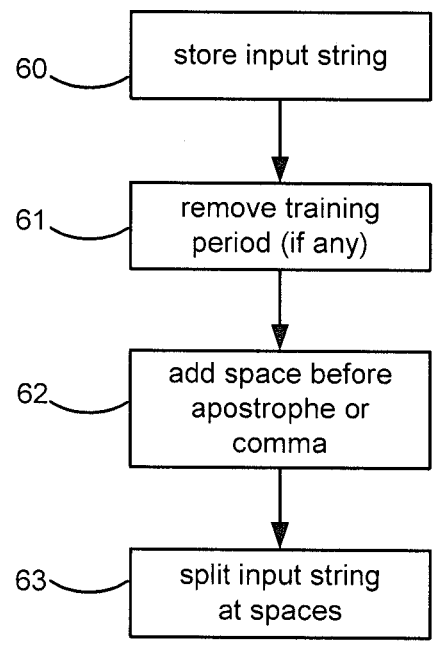
FIG. 4 is an operational flow diagram illustrating an embodiment of a process for representing a data string as a sequence of tokens.

The parsing problem can be modeled for software implementation. The input string obtained from a search in step 52 and stored in step 53 is represented as a token sequence $T=t_1 \ldots t_n$, and a simple process for tokenizing the input string prior in order to recognize entities in step 54 is illustrated in FIG. 4. In step 60, the input string is stored in temporary storage for processing. In step 61, a trailing period is removed from the input string if present. In step 62, a space is added to the input string before any apostrophe or comma. Finally, in step 63, the input string is split into parts or "entities" at the spaces. The resulting token sequence T is a sequence of actual values for entities, as shown below:

T=[Reid,Stratton,comma,Seven,Summits,Senior,Analyst]

The model thus defines a set of entities corresponding to the extracted information from the quotation, as shown above. For example, "primary entities" are defined as the principal types of information sought to be extracted, such as first_name, last_name, title and company. "Secondary entities" are defined to help recognize the primary entities in the input string. For example, the comma character (",") and the words "at", "of", "for" and "in" are all examples of secondary entities which give context to parsing the input string and provide linguistic clues to help identify relevant primary entities.

While it may be desirable to have a fixed set of primary entities as the subject for web crawling, the set of secondary entities is preferably not fixed in advance. Advantageously, any non-visible entity found in the training set can be defined as a secondary entity. This allows the model to automatically form probabilistic grammatical 'rules' from the training set.

Thus,stated generally, an input string is parsed into a token sequence $T=t_1 \ldots t_n$ and an entity sequence $E=e_1 \ldots e_j$ is associated with the token sequence T, where $j \leq n$. The entity sequence E may be interpreted as a parse of the token sequence, as illustrated below, where each entity $e_i$ is required to emit at least one token.

$$\underbrace{t_1 \ldots t_{i_1}}_{e_1} \underbrace{t_{i_1+1} \ldots t_{i_2}}_{e_2} \ldots \underbrace{t_{i_{j-1}} \ldots t_n}_{e_j}$$

The following is an example of how the input string described previously might be parsed:

$$\underbrace{\text{Reid}}_{first_{name}} \underbrace{\text{Stratton}}_{last_{name}} \underbrace{,}_{comma} \underbrace{[\text{Seven, Summits}]}_{title} \underbrace{[\text{Senior, Analyst}]}_{company}$$

Obviously, this parse is not accurate, but could result from a rule which says that a title field will appear before a company field.

For a given token sequence T, each parse (or alignment of entities) (T, E) has a probability $P_T(E)$ associated with it. This probability quantifies the likelihood that E is the correct entity sequence associated with the input string, and may be computed from a combination of entity recognition probabilities and linguistic probabilities (e.g., the word "at" is typically followed by a company name) and via a dynamic programming algorithm. The problem is to find the highest-probability alignment for a given T.

Figure 5:
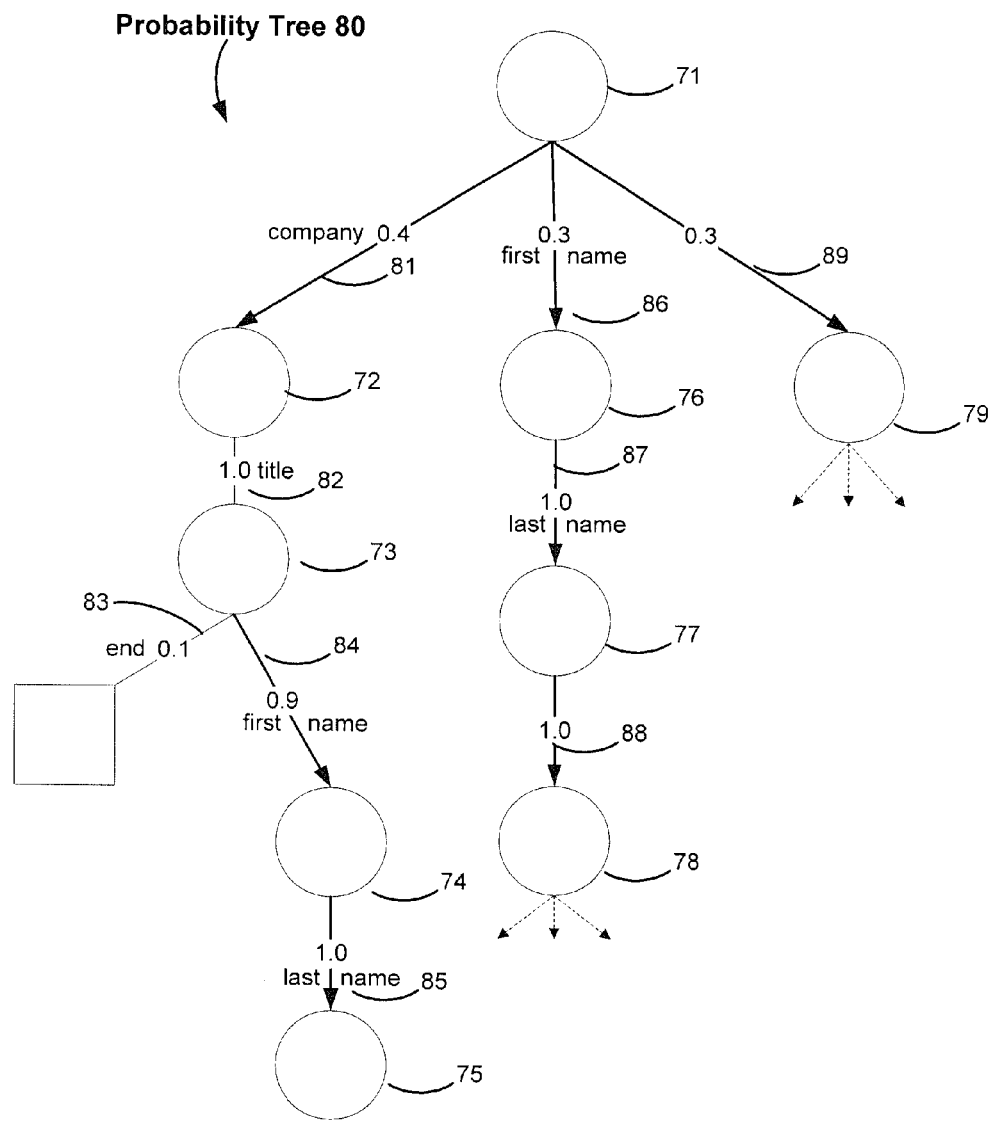
FIG. 5 is a representative tree-structure illustrating stored probabilities associated with aligning a sequence of entities.

One method solves this problem efficiently by using a probabilistic tree-like structure 80 to parse the input string, as shown in FIG. 5. Each arc (or path or branch) is labeled with a particular entity. Each node represents the entity sequence on the path from the root of the tree to this node. In the example of FIG. 5, node 71 is the root of the tree, and branch 81 represents the probability that the first entity recognized is a company name, which leads to node 72. Branch 82 represents the probability that the next entity recognized is a title, which leads to node 73. There is a small likelihood, represented by branch 83, that no more entities have been recognized. However, more probable is branch 84, which represents the probability that the next entity is a first name, which leads to node 74. Next is branch 85, which represents the probability that the next entity is a last name. That leads to node 75, which then represents the probability of the following entity sequence: company, title, first_name, last_name.

A different set of probabilities for a different entity sequence exist when branch 86 is followed from the root node 71, meaning that the first recognized entity was a first name. This leads to node 76, then to the next branch 87, which represents the probability that the next entity is a last name. This leads to node 77, then to branch 88, which represents the probability for another recognized entity, and finally to node 78. Yet another set of probabilities is represented by branch 89 to node 79, although this example is merely illustrative. Thus, the probabilistic calculations can be performed on a training set, then stored as a tree structure, which may be used and referenced by a suitable algorithm. A general discussion of how to evaluate the relevant probabilities follows next.

Let u denote a node and $e_1, \ldots, e_j$ the root-to-u path in the tree. Let v denote a child of u, i.e., there is an arc u→v. Let $e_{j+1}$ denote the entity on this path. The root-to-v arc is then $e_1, \ldots, e_{j+1}$. The probability P(v|u) associated with the arc u→v is then the probability $P(e_{j+1}|e_0, \ldots, e_j)$. (No Markovian simplifying assumption is made, i.e. the probability of the next entity being $e_{j+1}$ is allowed to depend on the entire sequence $e_1, \ldots, e_j$). The probability $P(e_{j+1}|e_1, \ldots, e_j)$ is only the transition probability. It does not take into account the entity recognition likelihood $P(t_j \ldots t_{j+1}|e_{j+1})$. The entity recognizer is a unit outside of the tree framework that may be invoked on demand to give us entity recognition likelihoods. (The entity recognizer is kept as a separate unit because it can be trained independently of the tree, using a very large training set).

A dynamic programming algorithm can be used to combine the transition probabilities on the tree and the probabilities returned by the entity recognizer to find an optimal (i.e., maximum likelihood) parse.

First, the use of a training set to learn probabilities will be described. There are two aspects to learning the probability tree: learning the structure of the tree (nodes and arcs), and then learning the arc probabilities P(v|u). Both of these aspects can be done automatically from a training set. This is very powerful because as the understanding of the problem improves over time (i.e., new training set examples are discovered), the model automatically improves itself—not only the probabilities, but also the structure.

Since the aim is only to learn the structure of the tree (nodes and arcs) and the arc probabilities, but not the entity recognition probabilities, the training set is simply a set $\{E_i\}$ of entity sequences. Each such entity sequence is the correct parse of some real token sequence. That is, it is as if we had the training set $\{(T_i, E_i)\}$, but threw away the $T_i$'s. Below is a useful example for such a training set.

$$\underbrace{\text{Reid}}_{first_{name}} \underbrace{\text{Stratton}}_{last_{name}} \underbrace{,}_{comma} \underbrace{\text{Seven Summits}}_{company} \underbrace{\text{Senior Analyst}}_{title}$$

The corresponding training set item would thus be the entity sequence:

[first_name,last_name,comma,company,title]

From a training set $\{E_i\}$, the nodes, the arcs, and the arc probabilities on the tree can be learned in the usual way. The probability $P(e_{j+1}|e_1, \ldots, e_j)$ of the arc u→v where $u=e_1, \ldots, e_j$ and the arc's label is $e_{j+1}$ is simply the number of entity sequences in the training set whose prefix is $e_1, \ldots, e_{j+1}$ divided by the number of entity sequences in the training set whose prefix is $e_1, \ldots, e_j$.

A matrix M is defined where $M_{u,j}$ is the score of the best alignment of a root-to-u path in the tree with the token sequence prefix $t_1 \ldots t_j$. This yields:

$M_{r,0}=1$//The tree's root r emits the empty prefix of T with probability 1.

$M_{r1}=0$ for $j>0$ //The tree's root cannot emit any non-empty prefix of T.

$$M_{vj} = a_{p_v v} * \max_{d_{p_v} \leq k < j} ([M_{p_v k} * P(t_{k+1} \ldots t_j | e_{p_v v}]\square))_\square, \ j \geq d_v.$$

Here $\alpha_{p_v v}$ denotes the probability on the arc $P_v \rightarrow v$, $d_v$ denotes the number of arcs in the root-to-v path, $e_{p_v v}$ denotes the entity on the arc $p_v \rightarrow v$ and $[P(t_{k+1} \ldots t_j | e_{p_v v}]\square)$ is the entity recognition likelihood of the token sequence slice $t_{k+1} \ldots t_j$ from the entity on the arc $p_v \rightarrow v$.

The matrix M is filled in as follows: Let $V_s=(v_o, \ldots, v_m)$ denote an ordering of the nodes of the tree such that $d_{v_i} \leq d_{v_{i+1}}$.

for v in $V_s$ in order for $j:d_v \leq j \leq n$, compute $M_{vj}$.

The matrix M thus captures only scores of alignments. An auxiliary matrix $P=(P_{vj})$ is used to capture additional data which aids in recovering an actual optimal alignment. $P_{vj}$ is set to the k that maximizes the expression described above which is used to compute $M_{vj}$.

Once the matrices M and P have been filled in, an optimal alignment is recovered as follows: First, a maximum-value cell $M_{l,n}$ among $\{M_{l,n}\}$ is found, where l denotes a leaf node in the tree. This determines the root-to-leaf path in an optimal alignment uniquely. This tells us the entity sequence $e_1 \ldots e_j$ aligned with the input token sequence $t_1 \ldots t_n$, but not the finer details of the alignment, specifically the indices $i_1, \ldots, i_{j-1}$ in the expression below.

$$\underbrace{t_1 \ldots t_{i_1}}_{e_1} \underbrace{t_{i_1+1} \ldots t_{i_2}}_{e_2} \ldots \underbrace{t_{i_{j-1}} \ldots t_n}_{e_j}$$

These indices are recovered in reverse by starting from $P_{l,n}$ and following the 'back-links' in the matrix P until reaching $P_{r0}$. A back-link is defined as follows: For any v,j where $v \neq r$ and $j>0$, $P_{vj}$ has a back-link to $P_{p,k}$ where k is the value of $P_{vj}$.

Thus far, the entity recognizer 35 has been simply described as a black-box to provide the likelihood P(T|E) where T denotes a token sequence and e an entity. However, the entity recognizer must distinguish between richly learned entities, identity entities, and entities learned in other ways. This distinction is made because certain entities require more comprehensive training sets in order to learn them well (and be accompanied by an appropriately sophisticated learning procedure), while others may be more simply learned.

All the primary entities—first_name, last_name, title, company—are richly learned entities. Richly learned entities must have a rich training set available, and a statistical classifier is used to learn to recognize these entities. As the relevant database (of contacts, for example) grows larger, the available training set automatically grows as well.

At the other extreme, identity entities do not require any training set. If e is an identity entity, then P(T|e)=1 if and only if T=e. As an example, P(at|at)=1. The power of identity entities comes from the ability of the tree learning procedure to automatically extract them from the training set, use them in the tree, and learn statistics from them (e.g., a company name almost always follows "at").

The rest of the entities operate differently. Some entities, e.g., middle_name, are recognized by a regular expression, so no learning is required. Others entities, e.g. company_ suffix (inc., corp., etc.), have a training set which takes the form of a dictionary, and may be used as a lookup function.

At present, the following entities have been defined for use in the probabilistic techniques described herein:

Primary: first_name, last_name, company, title;

Secondary (connectives): comma, at, for, of, apostrophe, and, with, the, in, a; and Secondary (other): companyqualifier, titlesuffix, companydescriptor, department, state, direction, region, city As shown in FIG. 2, a post-processing step 38 is often required to extract out the primary entities from the resultant alignment after processing by the extractor application 19b. In one typical post-processing embodiment, only the first_name, last_name, title, and company entities are ultimately extracted and used to update the contact. In the example shown in Table 4 above, a useful post-processing technique would be to append the sequence of entity values corresponding to state, and, direction, state and region to the title. This would provide enhanced biographical data regarding the contact, and would also provide a useful training set for evaluating probabilities upon parsing.

Post-processing also needs to stitch together a title when it gets split into multiple entities in the presence of certain connective entities. For example, a title such as "Vice President of Professional Development" has a title portion ("Vice President") and a title_suffix portion ("Professional Development") connected by the word "of." A useful post-processing step would combine the fields [title,of,title_suffix] into a single title.

It should be clear that post-processing steps can be appreciated and learned through the empirical examples of the training set(s).

System Overview

FIG. 6 illustrates a block diagram of an exemplary environment 110 wherein an on-demand database service might be used. Environment 110 may include user systems 112, network 114 and system 116. Further, the system 116 can include processor system 117, application platform 118, network interface 120, tenant data storage 122, system data storage 124, program code 126 and process space 128. In other embodiments, environment 110 may or may not have all of the components listed and/or may have other elements instead of, or in addition to, those listed above.

Environment 110 is an environment in which an on-demand database service exists. User system 112 may be any machine or system that is used by a user to access a database user system. For example, any of user systems 112 can be a handheld computing device, a mobile phone, a laptop computer, a work station, and/or a network of computing devices. As illustrated in FIG. 6 (and in more detail in FIG. 7), user systems 112 might interact via a network 114 with an on-demand database service, which in this embodiment is system 116.

An on-demand database service, such as system 116, is a database system that is made available to outside users that are not necessarily concerned with building and/or maintaining the database system, but instead, only that the database system be available for their use when needed (e.g., on the demand of the users). Some on-demand database services may store information from one or more tenants into tables of a common database image to form a multi-tenant database system (MTS). Accordingly, the terms "on-demand database service 116" and "system 116" are used interchangeably herein. A database image may include one or more database objects. A relational database management system (RDMS) or the equivalent may execute storage and retrieval of information against the database object(s).

Application platform 118 may be a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 116 implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 116 may provide tenant access to multiple hosted (standard and custom) applications, including a CRM application. User (or third party developer) applications, which may or may not include CRM, may be supported by the application platform 118, which manages creation, storage of the applications into one or more database objects and executing of the applications in a virtual machine in the process space of the system 116.

One arrangement for elements of system 116 is shown in FIG. 6, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 6 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide webpages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 7 also illustrates environment 110. However, in FIG. 7 elements of system 116 and various interconnections in an embodiment are further illustrated. FIG. 7 shows that user system 112 may include processor system 112A, memory system 112B, input system 112C, and output system 112D. FIG. 7 shows network 114 and system 116. FIG. 7 also shows that system 116 may include tenant data storage 112, tenant data 123, system data storage 124, system data 125, User Interface (UI) 130, Application Program Interface (API) 132, PL/SOQL 134, save routines 136, application setup mechanism 138, applications servers 10001-1000N, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 1000 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 34 that provides a programming language style interface extension to API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 7001 might be coupled via the network 614 (e.g., the Internet), another application server 700N−1 might be coupled via a direct network link, and another application server 700N might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled "Custom Entities and Fields in a Multi-Tenant Database System," and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for creating or updating a data set stored as a record in a database, wherein a plurality of data sets are stored in the database, wherein each data set in the plurality of data sets is defined to include a plurality of fields corresponding to a plurality of predefined entities, the method comprising:

searching through a plurality of documents for current information about the data set;

upon locating a search result document, in the plurality of documents, containing the current information about the data set, copying and storing a data string having a plurality of tokens from content of the search result document containing the current information about the data set;

extracting a sequence of tokens corresponding to the data string;

recognizing a first set of tokens in the sequence of tokens as a first entity based on entity recognition probabilistic scoring derived from a machine evaluation of a training set of entities;

recognizing a second set of tokens in the sequence of tokens as a second entity based on identifying the first entity as a first node in a tree-like structure and identifying the second entity as by a second node in the tree-like structure, the first node connected to the second node by an arc representing a probability that the first entity is followed by the second entity in a probable entity sequence, the first node connected to another node by another arc representing another probability that the first entity is followed by another entity in another probable entity sequence, the tree-like structure created by a machine evaluation of a training set of input strings;

aligning one or more tokens of the first set of tokens as one of a plurality of probable entities using the probabilistic scoring of the first set of tokens and grammatical rules;

assigning the aligned one or more tokens to one entity field of the plurality of predefined entity fields of the data set; and creating and storing a new record for the data set if none exists, or updating an existing record for the data set, using the assigned aligned one or more tokens.

2. The method of claim 1, wherein extracting the sequence of tokens includes:

aligning the plurality of probable entities into a sequence; and wherein the creating and storing the new record includes:

creating the new record or updating the existing record using the plurality of probable entities.

3. The method of claim 2, wherein aligning one or more tokens of the first set of tokens includes emulating the linguistic rules to obtain an alignment of tokens representing a defined entity sequence.

4. The method of claim 1, wherein the plurality of data sets store contact information including one or more entities, and wherein searching through the plurality of documents includes:

searching through the plurality of documents for current information instances of the one or more entities.

5. The method of claim 1, wherein each data set is a corresponding contact, wherein the corresponding contact is configured to have one or more defined entity fields having stored values associated with the corresponding contact, wherein extracting the sequence of tokens includes aligning the sequence of tokens with a sequence of the defined entity fields using the probabilistic scoring.

6. The method of claim 1, wherein extracting the sequence of tokens corresponding to the data string includes:

removing a trailing period if present;

adding a space before an apostrophe or a comma; and splitting the data string into a plurality of entities at each space added before the apostrophe or the comma.

7. The method claim 1, wherein extracting the sequence of tokens further includes:

identifying entities in the sequence of tokens;

evaluating the alignment of the sequence of tokens using the identified entities; and providing the entity values for the identified entities to the updating of the existing record.

8. The method of claim 1, wherein the probabilistic scoring for aligning the sequence of tokens is determined by analyzing the plurality of training sets of input strings to extract the accurate alignment of the entities.

9. The method of claim 8, wherein the analyzing the plurality of training sets of input strings includes:

emulating linguistic rules using the entities.

10. A non-transitory machine-readable medium carrying one or more sequences of instructions for updating information associated with a contact stored in a multi-tenant database system, which instructions, when executed by one or more processors, cause the one or more processors to:

obtain and store a data string having a plurality of tokens in content of a search result from a search for quoted material associated with the contact;

extract a sequence of tokens corresponding to the data string;

recognize a first set of tokens in the sequence of tokens as a first entity based on entity recognition probabilistic scoring derived from machine evaluation of a training set of entities;

recognize a second set of tokens in the sequence of tokens as a second entity based on identifying the first entity as a first node in a tree-like structure and identifying the second entity as by a second node in the tree-like structure, the first node connected to the second node by an arc representing a probability that the first entity is followed by the second entity in a probable entity sequence, the first node connected to another node by another arc representing another probability that the first entity is followed by another entity in another probable entity sequence, the tree-like structure created by a machine evaluation of a training set of input strings;

align one or more tokens of the first set of tokens as one of a plurality of probable entities using the probabilistic scoring of the first set of tokens and grammatical rules;

assign the aligned one or more tokens to one entity field of corresponding predefined entity fields of the contact based on the probabilistic scoring and the linguistic cues of the probable secondary entities; and create and store a new record for the contact if none exists, or update an existing record for the contact, using the assigned aligned one or more tokens.

11. The machine-readable medium of claim 10, wherein the instructions for extracting the sequence of tokens includes:

parsing the data string using probabilistic scoring to extract the sequence of tokens corresponding to the data string, wherein the sequence of tokens represent entity values; and aligning the sequence of tokens with a sequence of predefined entity fields using probabilistic scoring.

12. The machine-readable medium of claim 11, wherein the instructions for extracting the sequence of tokens includes:
   identifying entities in the sequence of tokens;
   evaluating the alignment of the sequence of tokens using the identified entities; and
   providing the entity values for the identified entities to the updating of the existing record for the data set.

13. The machine-readable medium of claim 11, wherein the instructions for parsing the data string includes:
   removing a trailing period if present;
   adding a space before an apostrophe or a comma; and
   splitting the data string into a plurality of entities at each space before the apostrophe or the comma.

14. The machine-readable medium of claim 11, wherein the instructions for aligning the one or more tokens of the first set of tokens includes emulating linguistic rules learned from training sets of input strings.

15. The machine-readable medium of claim 13, wherein the instructions for aligning the one or more tokens of the first set of tokens includes applying stored probabilities, said stored probabilities learned from training sets of input strings.

16. An apparatus for extracting contact data from quotes, wherein a plurality of contacts are stored in a multi-tenant database, the apparatus comprising:
   a processor; and
   one or more stored sequences of instructions which, when executed by the processor, cause the processor to:
      obtain and store a data string having a plurality of tokens in content of a search result from a search for quoted material associated with a contact;
      extract a sequence of tokens corresponding to the data string;
      recognize a first set of tokens in the sequence of tokens as a first entity based on entity recognition probabilistic scoring derived from a machine evaluation of a training set of entities;
      recognize a second set of tokens in the sequence of tokens as a second entity based on identifying the first entity as a first node in a tree-like structure and identifying the second entity as by a second node in the tree-like structure, the first node connected to the second node by an arc representing a probability that the first entity is followed by the second entity in a probable entity sequence, the first node connected to another node by another arc representing another probability that the first entity is followed by another entity in another probable entity sequence, the tree-like structure created by a machine evaluation of a training set of input strings;
      align one or more tokens of the first set of tokens as one of a plurality of probable entities using the probabilistic scoring of the first set of tokens and grammatical rules;
      assign the aligned one or more tokens to one entity field of corresponding predefined entity fields of the contact based on the probabilistic scoring and the linguistic cues of the probable secondary entities; and
      create and store a new record for the contact if none exists, or updating an existing record for the contact, using the assigned aligned one or more tokens.

17. The apparatus of claim 16, wherein the probabilistic scoring is learned from a plurality of training sets of input strings.

18. A method for transmitting code for extracting contact data from quotes in a multi-tenant database system on a transmission medium, the method comprising:
   transmitting code to obtain and store a data string having a plurality of tokens in content of a search result from a search for quoted material associated with a contact;
   transmitting code to extract a sequence of tokens corresponding to the data string;
   transmitting code to recognize a first set of tokens in the sequence of tokens as a first entity based on entity recognition probabilistic scoring derived from a machine evaluation of a training set of entities;
   transmitting code to recognize a second set of tokens in the sequence of tokens as a second entity based on identifying the first entity as a first node in a tree-like structure and identifying the second entity as by a second node in the tree-like structure, the first node connected to the second node by an arc representing a probability that the first entity is followed by the second entity in a probable entity sequence, the first node connected to another node by another arc representing another probability that the first entity is followed b another entity in another probable entity sequence, the tree-like structure created by a machine evaluation of a training set of input strings;
   transmitting code to align one or more tokens of the first set of tokens as one of a plurality of probable entities using the probabilistic scoring of the first set of tokens and grammatical rules;
   transmitting code to assign the aligned one or more tokens to one entity field of the plurality of predetermined entity fields of the data set; and
   transmitting code to create and store a new record for the data set if none exists, or updating an existing record for the data set, using the assigned aligned one or more tokens.

19. The method of claim 18, wherein the probabilistic scoring is learned from training sets of input strings.

* * * * *